United States Patent
Schütze et al.

(10) Patent No.: US 12,480,794 B2
(45) Date of Patent: Nov. 25, 2025

(54) MODULAR MEASURING DEVICE

(71) Applicant: Endress+Hauser Flowtec AG, Reinach (CH)

(72) Inventors: Christian Schütze, Basel (CH); Benjamin Schwenter, Ettingen (CH); Marc Werner, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 333 days.

(21) Appl. No.: 18/249,210

(22) PCT Filed: Sep. 13, 2021

(86) PCT No.: PCT/EP2021/075128
§ 371 (c)(1),
(2) Date: Apr. 14, 2023

(87) PCT Pub. No.: WO2022/078685
PCT Pub. Date: Apr. 21, 2022

(65) Prior Publication Data
US 2023/0408314 A1   Dec. 21, 2023

(30) Foreign Application Priority Data
Oct. 16, 2020   (DE) ............. 10 2020 127 356.8

(51) Int. Cl.
G01F 1/84 (2006.01)
(52) U.S. Cl.
CPC .......... G01F 1/8409 (2013.01); G01F 1/8413 (2013.01); G01F 1/8422 (2013.01); G01F 1/8427 (2013.01)

(58) Field of Classification Search
CPC .... G01F 1/8409; G01F 1/8413; G01F 1/8422; G01F 1/8427
See application file for complete search history.

(56) References Cited

U.S. PATENT DOCUMENTS

| | | |
|---|---|---|
| 5,602,344 A | 2/1997 | Lew et al. |
| 5,663,509 A | 9/1997 | Lew et al. |
| (Continued) | | |

FOREIGN PATENT DOCUMENTS

| | | |
|---|---|---|
| CN | 102076458 A1 | 5/2011 |
| CN | 108713131 A1 | 10/2018 |
| (Continued) | | |

OTHER PUBLICATIONS

Ramseyer et al., Interface for Connecting a Fluid Measurement Point, and Modular Fluid Measurement System, Feb. 2020, FIT Machine Translation (Year: 2020).*

*Primary Examiner* — Erika J. Villaluna
(74) *Attorney, Agent, or Firm* — Christopher R. Powers; Endress+Hauser (USA) Holding, Inc.

(57) ABSTRACT

The present disclosure relates to a modular measuring device including: a measuring tube module, wherein the measuring tube module includes a fixing body arrangement; an oscillation exciter; at least one oscillation sensor; and a support module including a seat, wherein the measuring tube module is arrangeable in the seat of the support module, wherein the support module includes a fixing apparatus, wherein the fixing apparatus includes an at least sectionally eccentrically embodied shaft, wherein the fixing apparatus, especially the shaft, is adapted to clamp the measuring tube module via the fixing body arrangement in the seat and to connect the measuring tube module mechanically releasably with the support module.

7 Claims, 3 Drawing Sheets

(56) References Cited

U.S. PATENT DOCUMENTS

| | | | |
|---|---|---|---|
| 6,470,820 | B1 | 10/2002 | Wilkins |
| 10,209,113 | B2 | 2/2019 | Young et al. |
| 2020/0319006 | A1 | 10/2020 | Malani et al. |
| 2021/0318154 | A1* | 10/2021 | Malani .................. G01F 1/8413 |

FOREIGN PATENT DOCUMENTS

| | | |
|---|---|---|
| CN | 110115619 A1 | 8/2019 |
| CN | 111344539 A1 | 6/2020 |
| DE | 102018119887 A1 | 2/2020 |
| EP | 1807681 A2 | 7/2007 |
| WO | 2011099989 A1 | 8/2011 |
| WO | 2020035305 A1 | 2/2020 |

\* cited by examiner

MODULAR MEASURING DEVICE

CROSS-REFERENCE TO RELATED APPLICATIONS

The present application is related to and claims the priority benefit of German Patent Application No. 10 2020 127 356.8, filed on Oct. 16, 2020, and International Patent Application No. PCT/EP2021/075128, filed Sep. 13, 2021, the entire contents of which are incorporated herein by reference.

TECHNICAL FIELD

The invention relates to a modular measuring device for registering mass flow, viscosity, density and/or a variable derived therefrom for a flowable medium, especially a modularly embodied, Coriolis flow measuring device, preferably for pharmaceutical bioprocess applications.

BACKGROUND

Field devices of process measurements technology having a measuring transducer of vibration type and, especially, Coriolis flow measuring devices have been known for many years. The basic construction of such a measuring device is described, for example, in EP 1 807 681 A1, wherein comprehensive reference is taken to this publication in the context of the present invention regarding the construction of a field device of the field of the invention.

Typically, Coriolis flow measuring devices have one or more oscillatable measuring tubes, which are caused to execute oscillations by means of an oscillation exciter. The oscillations travel over the tube length and are varied by the type of medium flowing in the measuring tube and its flow velocity. An oscillation sensor, or especially two mutually spaced oscillation sensors, can register the varied oscillations at another position of the measuring tube in the form of a measurement signal or a plurality of measurement signals. From the one or more measurement signals, an evaluation unit can then ascertain the mass flow, viscosity and/or density of the medium. The oscillatable measuring tubes are usually connected via manifolds by material bonding with process connections and housing.

Known are modular Coriolis flow measuring devices with replaceable, single-use measuring tube arrangements, in the case of which no material bonded connections between measuring tubes and housing are needed. This means that the measuring tubes can be replaced. Taught, for example, in WO 2011/099989 A1 is a method for producing a monolithically formed, measuring tube arrangement of a Coriolis flow measuring device with curved measuring tubes, wherein the measuring tube bodies of the measuring tubes are first solidly formed of a polymer and the channels to convey the flowable medium are then machined in with a cutting tool. WO 2011/099989 A1 teaches, as does U.S. Pat. No. 10,209,113 B2, a fixing body arrangement, which is adapted to receive and to support a replaceable measuring tube module of thin walled, plastic tubes. The securing of the measuring tube modules in a support module equipped with the needed exciters and sensors occurs via the fixing body arrangement.

The mechanical properties of the measuring tube modules suitable for Coriolis flow measuring devices can vary greatly. Therefore, specific, characteristic variables in a Coriolis flow measuring device such as calibration factor and zero point must be ascertained before use. It has been found that the zero point determined in a last step of the manufacturing differs, as a rule, from the actual zero point of the replaceable measuring tube module in use. Such a deviation can be predicted only with difficulty. A reason is the only difficultly reproducible degree of securement of the measuring tube module in the support module. Another influence comes from microfrictions between measuring tube module and support module.

SUMMARY

An object of the invention is to provide a user-friendly assemblable, modular measuring device, whose zero point in use differs only minimally from the zero point ascertained in the last fine tuning of the manufacture.

The object is achieved by a modular measuring device according to the present disclosure.

The modular measuring device of the invention for registering mass flow, viscosity, density and/or a variable derived therefrom for a flowable medium, especially a modularly embodied, Coriolis flow measuring device preferably for pharmaceutical bioprocess applications, comprises:

a measuring tube module, especially a measuring tube module embodied as a single-use article,
  wherein the measuring tube module includes at least one measuring tube, through which medium can flow,
  wherein the measuring tube module includes a fixing body arrangement secured to the at least one measuring tube;

an oscillation exciter, which is adapted to excite the measuring tube to execute oscillations, especially an oscillation exciter including an exciter magnet and an exciter coil
  wherein at least one component of the oscillation exciter, especially the exciter magnet, is arranged on the measuring tube module;

at least one oscillation sensor, which is adapted to register oscillations of the at least one measuring tube, especially an oscillation sensor including a sensor magnet and a sensor coil,
  wherein at least one component of the oscillation sensor, especially the sensor magnet, is arranged on the measuring tube module;

a support module, especially a support module including a seat, the sensor coil and the exciter coil,
  wherein the measuring tube module is arrangeable in the seat of the support module,
  wherein the support module includes a fixing apparatus,
  wherein the fixing apparatus includes an at least sectionally eccentrically embodied shaft,
  wherein the shaft is adapted to clamp the measuring tube module via the fixing body arrangement in the seat and to connect the measuring tube module mechanically releasably with the support module.

Previously known fixing apparatuses have the disadvantage that they, on the one hand, insufficiently protect the measuring tube module against external disturbances and microfrictions, and, on the other hand, the degree of securement is not reproducible, such that, in most cases, after the securing of the measuring tube module in the support module the actually present zero point differs from the zero point ascertained in the manufacture.

A shaft is an elongated, especially cylindrical and rotatable, body, which serves for transferring rotational movements and torques. It is, as a rule, supported on the support module by at least one rotary bearing. When transferring torques, the shaft is loaded in torsion. The eccentrically embodied part of the shaft presses against the fixing body arrangement and so clamps the measuring tube module in the seat.

Because of the mechanically releasable connection of the measuring tube module in the support module, the invention means that no material bonded connections need to be breached, in order to effect a replacement. The invention is especially user-friendly, because no additional mechanical tools—such as a screwdriver—are needed for the mechanically releasable connecting of the measuring tube module.

Advantageous embodiments of the invention are set forth in the dependent claims.

An embodiment provides that the shaft is embodied as a camshaft having at least one cam and accommodated on the support module.

A camshaft is a rod shaped body, thus a shaft, on which at least one projection, especially a rounded projection, the so-called cam, is present. The rod shaped body rotates about its own axis, and this rotational movement is repeatably converted by the one or more cams present on it into short, longitudinal movements.

Upon the exciting of the at least one measuring tube, also the fixing body arrangement is caused to execute oscillations, since it is connected with the at least one measuring tube. Such a movement is disadvantageous for measuring performance. The fixing by means of a camshaft suppresses these oscillations. The cam of the camshaft presses the fixing body arrangement in the direction of the seat and clamps it in the seat. Thus, measuring tube module movements in the seat are eliminated.

An embodiment provides that the fixing body arrangement includes a depression, which is embodied, at least partially, complementary to the eccentric section of the shaft, especially to the at least one cam,
wherein the depression is embodied to form an at least shape-interlocking connection with the eccentric section of the shaft, especially with the at least one cam.

A depression in the fixing body arrangement has the advantage that it can be assured that a proper arrangement of the measuring tube module and/or the shaft occurs. Only after the eccentric section of the shaft, i.e., the cam, has entered with shape interlocking into the depression are measuring tube module and support module located in a desired position relative to one another, such that a deviation of the zero point resulting from a defective arrangement and/or fixing of the measuring tube module is then prevented.

An embodiment provides that the fixing apparatus, especially the shaft and preferably the camshaft, is accommodated movably in a longitudinal direction.

Such an embodiment enables an easy operating of the fixing apparatus and a user-friendly replacement of the measuring tube module with a very good reproducibility of the force- and/or shape-interlocking connection. The user moves the shaft, i.e., the camshaft, in its longitudinal direction and so disengages the seat, such that the measuring tube module can be inserted. For fixing the measuring tube module, the shaft, i.e., the camshaft, is moved back into the closing position and rotated, in order to clamp the measuring tube module in the seat.

An embodiment provides that the fixing apparatus, especially the shaft, is embodied in such a manner that a movement in a longitudinal direction is possible at least sectionally exclusively in a discrete number of orientations, especially in exactly one orientation and preferably in exactly two orientations of the fixing apparatus, especially the shaft and preferably the camshaft.

From this there results the advantage that, in the case of the replacement of the measuring tube module, a falling of the shaft, i.e., the camshaft, out of one of the rotary bearings can be prevented and a reproducible positioning of the eccentric section, i.e., the at least one cam, in a provided desired position is implemented.

BRIEF DESCRIPTION OF THE DRAWINGS

The invention will now be explained in greater detail based on the appended drawing, the figures of which show as follows.

DETAILED DESCRIPTION

Figure 1:
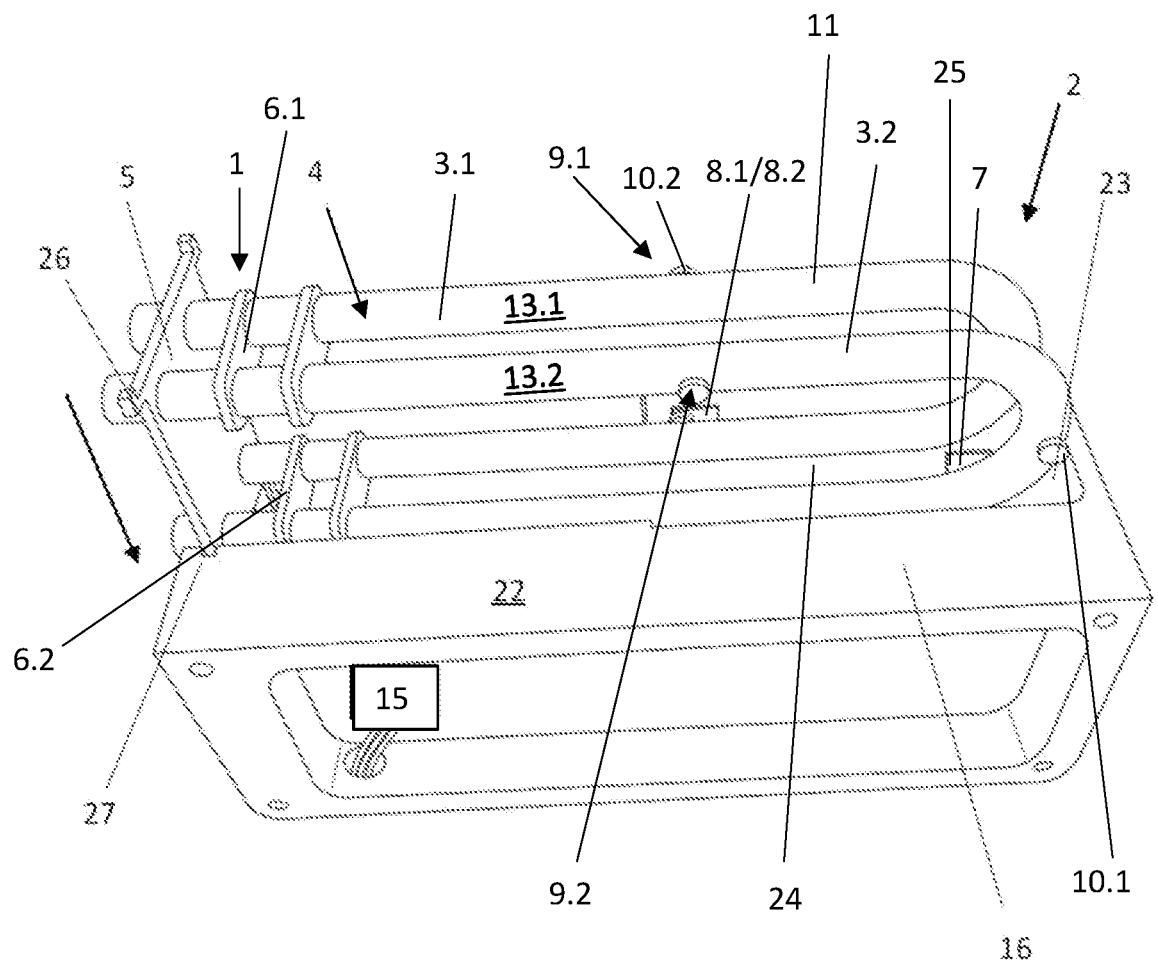
FIG. 1 shows a perspective view of an embodiment of a modularly formed Coriolis flow measuring device according to the present disclosure.

FIG. 1 shows a perspective view of a measuring device for pharmaceutical bioprocess applications. Shown is a modularly embodied, Coriolis flow measuring device. The measuring tube module 4 is suited to be inserted replaceably and mechanically releasably into a support module 16. The mechanically releasable connection occurs via a fixing apparatus (not shown) arranged on the support module. In order to implement easy replacement of the measuring tube module 4, only single components of the oscillation exciter 7 and the oscillation sensors 8.1, 8.2, in this case their magnet arrangements 9.1, 9.2, are placed on the measuring tube module 4. These require no electrical connection with a measuring and/or operating circuit 15. The additional components of the oscillation exciter 7 and the oscillation sensors 8.1, 8.2 are arranged on the support module 16, especially in the seat 23, which is suited and embodied for receiving the measuring tube module 4. The measuring tube module 4 includes two sectionally bent, mutually parallel measuring tubes 3.1, 3.2, which are connected together via a coupling arrangement 1 (composed of four coupling elements 6) and a fixing body arrangement 5. Alternatively, the measuring tube module 4 can also comprise exclusively one measuring tube 3 or more than two measuring tubes 3. Two coupling elements 6.1 are at the inlets and two coupling elements 6.2 are at the outlets of the measuring tubes 3.1, 3.2. The connections between the coupling elements and tubes are by material bonding. The measuring tubes 3.1, 3.2 are so formed that the flow direction into the inlets is opposite to the flow direction from the outlets. Manifolds (not shown) can be arranged at the inlet and outlet ends with process connections for connecting with a hose and/or plastic tube system. In an embodiment, just one manifold (not shown) with appropriate internal passageways can be provided instead of two separate manifolds. The one manifold is plugged onto the inlet and outlet ends and contributes to decouple the measuring tube module 4 after its installation in the support module 16 from external disturbances from the environment. The individual coupling elements 6 are embodied plate-shaped and can have one- or two-part constructions. The coupling elements 6 can grip the measuring tubes 3.1, 3.2 completely or only partially. The shown measuring tubes 3.1, 3.2 are embodied with U-shape, i.e., they have, in each case, two essentially parallel legs 11, which are connected via a curved subsection. Arranged on each measuring tube 3.1, 3.2 is, in each case, exactly one magnet arrangement 9.1, 9.2. Arranged in the curved subsection is a magnet 10.1 of the magnet arrangement 9.1. Magnet 10.1 forms a component of the oscillation exciter 7. Placed on the legs 11, in each case, is a magnet 10.2, which forms a part of the oscillation sensor 8. The magnets 10 are placed on mounting areas. The mounting areas are located in the illustrated embodiment on the measuring tubes 3.1, 3.2. Alternatively, the measuring tube module 4 can also have one or more straight measuring tubes 3. The form of the measuring tubes 3 can differ from the shown shape.

Measuring tube module 4 is partially introduced into a seat 23 of a support module 16. An arrow indicates the direction of introduction. The introduction direction extends in the illustrated embodiment perpendicularly to a longitudinal direction of the seat 23. Alternatively, the seat 23 can also be embodied in such a manner that the measuring tube arrangement 4 is introduced in the longitudinal direction of the seat 23. The support module 16 includes a measuring and/or operating circuit 15, which is connected with the two oscillation exciters 7 and a total of four oscillation sensors 8, especially with their coil apparatuses 25, in order to produce and/or to register a time-alternating magnetic field. Support module 16 includes a support module body 22, which bounds the seat 23. The fixing body arrangement 5 of the measuring tube module 4 includes assembly areas 26, which serve to arrange the measuring tube module 4 in a predetermined position in the support module 16. In the illustrated embodiment, the assembly areas 26 point perpendicularly to the longitudinal direction of the measuring tube module 4. In another advantageous embodiment, the assembly areas 26 point in the direction of the longitudinal direction of the measuring tube module 4. The areas of the support module body 22 in contact with the assembly areas 26 of the fixing body arrangement 5 are referred to as bearing areas 27.

Support module 16 includes two mutually parallel, lateral areas, which bound the seat 23 transversely to the longitudinal direction of the seat 23. Arranged on or in the lateral areas are the coil apparatuses 25 of the oscillation sensors 8.1, 8.2 and the coil apparatus 25 of the oscillation exciter 7. The coil apparatuses 25 of the oscillation sensors 8.1, 8.2 are arranged offset in the longitudinal direction of the seat 23 from the coil apparatus 25 of the oscillation exciter 7. Furthermore, the three coil apparatuses 25 are embodied as plate coils and arranged sunken in the lateral areas. Arranged on the lateral areas are three coil apparatuses 25 lying essentially opposite the corresponding magnet arrangements 9.1, 9.2. Machined into the two lateral areas, in each case, is a guideway, which extends perpendicularly to the longitudinal direction of the seat 23 and in parallel with the plane of the coils. In the illustrated embodiment, the seat 23 extends above the two end faces of the seat 23. This enables introduction of the measuring tube module 4 perpendicularly to the longitudinal direction of the measuring tube module 4. In another embodiment, the seat 23 extends exclusively above one end face of the support module 16. In that case, the measuring tube module 4 can be introduced into the support module 16 in the longitudinal direction of the measuring tube module 4, or the longitudinal direction of the support module 16.

Figure 2A:
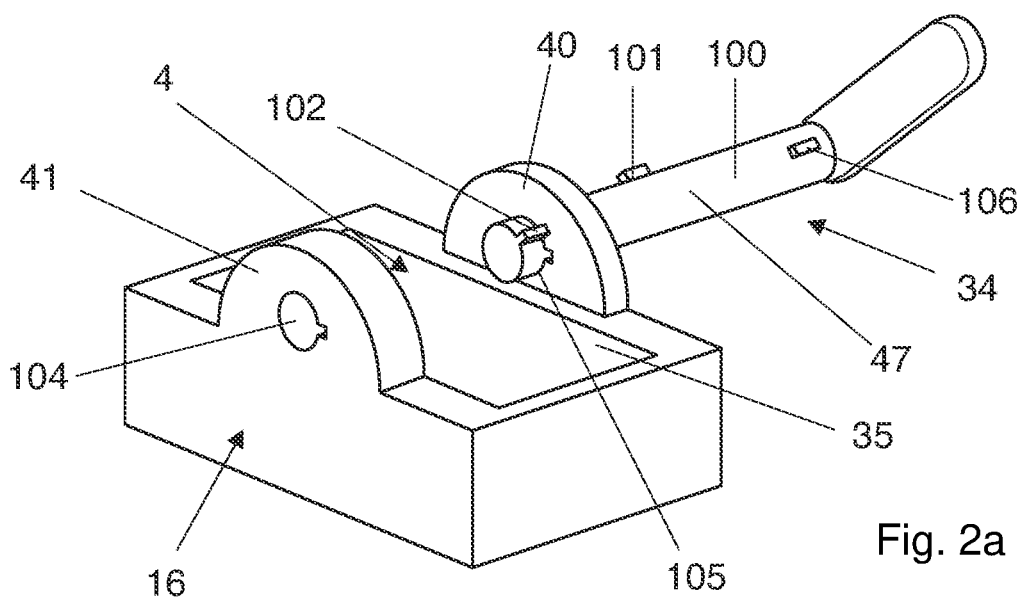
FIG. 2a shows an introduction position for a measuring tube module in a seat of a support module of an embodiment of the fixing apparatus according to the present disclosure.
Figure 2B:
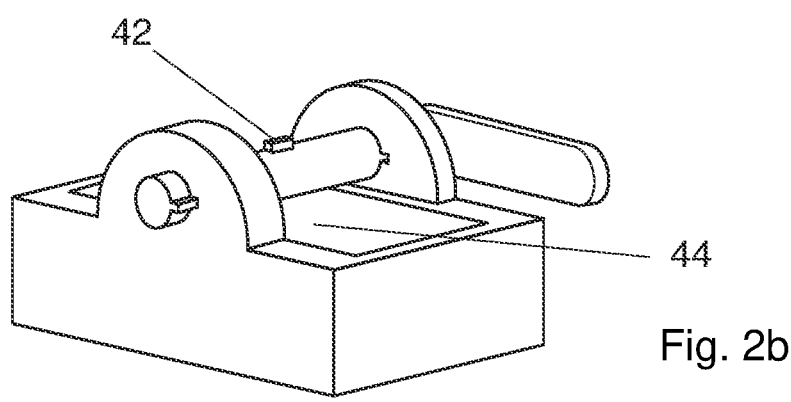
FIG. 2b shows a starting orientation of a shaft an embodiment of the fixing apparatus according to the present disclosure.
Figure 2C:
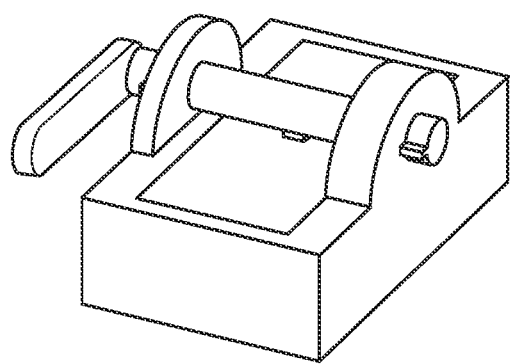
FIG. 2c shows an interlocking orientation of the shaft an embodiment of the fixing apparatus according to the present disclosure.

FIGS. 2a-2c show perspective views the fixing of a measuring tube module 4 in a seat of a support module 16 by means of an embodiment of the invention for the fixing apparatus 34. Measuring tube module 4 is arranged in the seat 23 of the support module. The fixing apparatus 34 includes an at least sectionally eccentrically embodied shaft 100, which is adapted to clamp the measuring tube module 4 in the seat 23 by interacting with the fixing body arrangement 35 in such a manner that the measuring tube module 4 is connected mechanically releasably with the support module 16. In the displayed case, the shaft 100 of the fixing apparatus 34 is embodied as a camshaft accommodated on the support module 16 and having a cam 101. In order to adapt the securing of the measuring tube module 4 in the seat 23 as a function of the application, more than the one displayed cam 101 can be provided. The shaft 100 is accommodated movably in a longitudinal direction of the shaft 100, such that it need not block the seat during introduction of the measuring tube module 4 (see FIG. 2a). A first projection 102 on the shaft 100 prevents it from falling out, whereby a user-friendly mounting the measuring tube module 4 is enabled. The first projection 102 is not involved with clamping the measuring tube module 4 in the seat 23. The fixing apparatus 34 includes, additionally, a first rotary bearing 104 and a second rotary bearing 105 to guide the shaft 100 in desired degrees of freedom. The shaft 100 is connectable mechanically releasably and rotatably around its longitudinal axis with the first rotary bearing 104 and the second rotary bearing 105. Cam 101 has at least one mounting area 42 and the fixing body arrangement 35 correspondingly at least one bearing area 44. In an installed state of the measuring tube module 4 in the seat of the support module 16, the at least one mounting area 42 or the exactly one mounting area 42 of the cam 101 lies on the at least one bearing area 44 of the fixing body arrangement 35, this in turn meaning that a force- and/or shape-interlocking connection of the measuring tube module 4 with the support module occurs. This connection is produced by a rotating of the shaft 100 about its longitudinal axis.

Shaft 100 is, additionally, embodied in such a manner that a movement thereof in a longitudinal direction is possible at least sectionally exclusively in a discrete number of orientations of the shaft 100. In a first section, the shaft 100 can be led through sectionally in exactly one orientation and, in a second section, the moving of the shaft 100 sectionally through is possible exclusively in exactly two orientations. In the illustrated embodiment, this is implemented by providing the shaft 100, supplementally to the cam 101, with the first projection 102 and a second projection 106. The second projection 106 is, like the first projection, not intended for forming the shape- and/or force-interlocking connection. The first projection 102 and the second projection 106 extend, in each case, radially out from the shaft 100. The first projection 102 and the second projection 106 are arranged spaced relative to the cam 101 and relative to one another in the longitudinal direction of the shaft 100. The first projection 102 and the second projection 106 are arranged and spaced in such a manner on the shaft 100 that at least after the movement of the cam 101 from the second rotary bearing 105 a movement of the shaft 100 in the direction of the longitudinal axis is blocked except preferably exclusively in exactly one orientation of the shaft 100. Such is implemented in the embodiment by means of a passageway.

Alternatively, the shaft and the first projection 102 can be embodied as two parts, i.e. the first projection 102 is arrangeable as a separate component in a seat of the shaft 100. While the first projection 102 serves to prevent a falling of the shaft 100 out of the first rotary bearing 104 during the assembly, the second projection 106 serves essentially to limit the movement of the shaft 100 in its longitudinal direction and, thus, to bring the cam 101 into the provided, desired position (see second view). The second projection 106 can, thus, also be ring-shaped or at least not complementary to the opening of the bearing through which the shaft 100 extends. The illustrated shaft 100 includes a lever on one end to facilitate operation of the fixing apparatus 34.

Starting from the orientation of the shaft 100 shown in FIG. 2b, a rotation of shaft 100, in the illustrated case by 180°, leads to the forming of the shape- and/or force-interlocked connection with the fixing body arrangement 35 of the measuring tube module 4 (see FIG. 2c). Alternatively, an electronic apparatus can be provided, which effects the movement of the shaft 100 in its longitudinal direction and the rotation of the shaft 100 around the longitudinal axis, for example, by linear and/or rotary motor.

Figure 3:
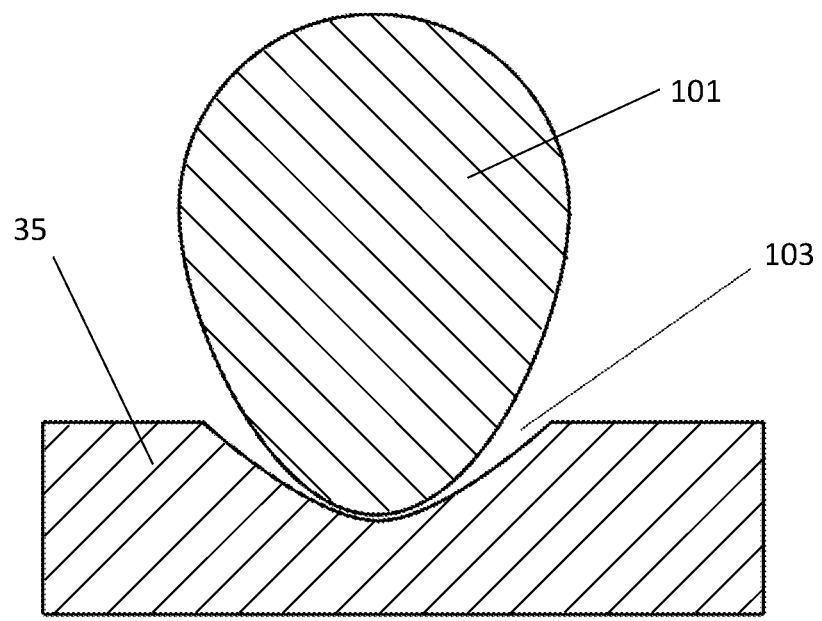
FIG. 3 shows a cross-section of an embodiment of a camshaft and a fixing body arrangement having a depression according to the present disclosure.

FIG. 3 shows a cross-section of an embodiment of the camshaft and a fixing body arrangement 35 having a depression 103, which is embodied, at least partially, complementary to the at least one cam 101, i.e., to the eccentric section of the shaft. Depression 103 is embodied to form with the at least one cam 101, i.e., the eccentric section, an at least shape-interlocking connection and, thus, to clamp the measuring tube module via the fixing body arrangement 35 in the seat. The bearing area is located in the illustrated embodiment in the depression 103.

The invention claimed is:

1. A modular measuring device for registering mass flow, viscosity, density and/or a variable derived therefrom for a flowable medium, modular measuring device comprising:
   a measuring tube module configured to be a single-use article, wherein the measuring tube module includes at least one measuring tube configured to enable the medium to flow therethrough, wherein the measuring tube module includes a fixing body arrangement secured to the at least one measuring tube;
   an oscillation exciter configured to excite the at least one measuring tube to execute oscillations, wherein the oscillation exciter includes an exciter magnet and an exciter coil, wherein at least one component of the oscillation exciter is arranged on the measuring tube module;
   at least one oscillation sensor configured to detect oscillations of the at least one measuring tube, wherein in the at least one oscillation sensor includes a sensor magnet and a sensor coil, wherein at least one component of the oscillation sensor is arranged on the measuring tube module; and
   a support module, which includes a seat, the sensor coil and the exciter coil, wherein the seat is configured to facilitate introduction of the measuring tube module in the support module,
   wherein the support module includes a fixing apparatus, which includes a shaft, which is at least sectionally eccentrically embodied,
   wherein the shaft is adapted to clamp the measuring tube module via the fixing body arrangement in the seat and to connect the measuring tube module mechanically releasably with the support module, and
   wherein the shaft is embodied as a camshaft including at least one cam, and wherein the shaft is mounted on the support module.

2. The modular measuring device of claim 1, wherein the fixing body arrangement includes a depression configured, at least partially, complementary to the eccentric section of the shaft, and
   wherein the depression is configured to form an at least shape-interlocking connection with the eccentric section of the shaft.

3. The modular measuring device of claim 2, wherein the depression of the fixing body arrangement is configured, at least partially, complementary to at least one cam of the eccentric section of the shaft, and
   wherein the depression is configured to form the at least shape-interlocking connection with the at least one cam.

4. The modular measuring device of claim 1, wherein the shaft of the fixing apparatus is mounted movably in a longitudinal direction of the shaft.

5. The modular measuring device of claim 4, wherein the shaft is configured such that a movement in the longitudinal direction is possible, at least sectionally, exclusively in a discrete number of orientations.

6. The modular measuring device of claim 5, wherein the number of discrete orientations is exactly one orientation of the shaft.

7. The modular measuring device of claim 5, wherein the number of discrete orientations is exactly two orientations of the shaft.

* * * * *